(12) United States Patent
Uemura

(10) Patent No.: US 9,221,318 B2
(45) Date of Patent: Dec. 29, 2015

(54) AIR CONDITIONER FOR VEHICLE

(75) Inventor: Yukio Uemura, Nagoya (JP)

(73) Assignee: DENSO COPORATION, Kariya (JP)

( * ) Notice: Subject to any disclaimer, the term of this patent is extended or adjusted under 35 U.S.C. 154(b) by 623 days.

(21) Appl. No.: 13/539,851

(22) Filed: Jul. 2, 2012

(65) Prior Publication Data

US 2013/0008627 A1 Jan. 10, 2013

(30) Foreign Application Priority Data

Jul. 6, 2011 (JP) .................................. 2011-149862

(51) Int. Cl.
*B60H 1/00* (2006.01)

(52) U.S. Cl.
CPC ........ *B60H 1/00692* (2013.01); *B60H 1/00849* (2013.01)

(58) Field of Classification Search
CPC ....................................................... F28F 27/02
USPC ..................................... 165/41, 202
See application file for complete search history.

(56) References Cited

U.S. PATENT DOCUMENTS

| 5,062,473 | A | * | 11/1991 | Ostrand et al. ................... | 165/42 |
| 6,308,770 | B1 | * | 10/2001 | Shikata et al. ................... | 165/42 |
| 6,508,703 | B1 | * | 1/2003 | Uemura et al. ................ | 454/156 |
| 7,285,041 | B2 | * | 10/2007 | Yoshida et al. ............... | 454/143 |
| 7,546,868 | B2 | * | 6/2009 | Klein et al. .................... | 165/203 |
| 7,794,314 | B2 | * | 9/2010 | Sekiya et al. ................. | 454/334 |
| 8,113,268 | B2 | * | 2/2012 | Stevenson ........................ | 165/42 |
| 8,757,245 | B2 | * | 6/2014 | Richter et al. ................... | 165/42 |
| 2002/0197951 | A1 | * | 12/2002 | Uemura et al. ............... | 454/121 |
| 2004/0089006 | A1 | * | 5/2004 | Kamiya et al. .................. | 62/244 |
| 2004/0194947 | A1 | * | 10/2004 | Ito et al. ......................... | 165/203 |
| 2010/0167635 | A1 | * | 7/2010 | Gotoh et al. .................. | 454/121 |
| 2013/0008627 | A1 | * | 1/2013 | Uemura .......................... | 165/96 |

FOREIGN PATENT DOCUMENTS

| JP | 9-175147 | 7/1997 | | |
| JP | 2000-43535 | 2/2000 | | |
| JP | 2000043535 A | * 2/2000 | ............... | B60H 1/00 |
| JP | 2009-184495 | 8/2009 | | |
| JP | 2010-70082 | 4/2010 | | |
| JP | 2012-224205 | 11/2012 | | |
| JP | 2012-224206 | 11/2012 | | |

OTHER PUBLICATIONS

Office action dated May 6, 2014 in corresponding Chinese Application No. 2012 10214737.4.

* cited by examiner

*Primary Examiner* — Marc Norman
*Assistant Examiner* — Devon Russell
(74) *Attorney, Agent, or Firm* — Harness, Dickey & Pierce, P.L.C.

(57) ABSTRACT

An air conditioner for a vehicle includes a casing having therein first and second air passages through which outside air and inside air flow respectively. A heating heat exchanger is arranged in the first and second air passages to heat air. First and second air mix doors are arranged respectively in the first and second air passages to adjust a ratio between a flow amount of air passing through the heating heat exchanger and a flow amount of air bypassing the heating heat exchanger. Each of the first and second air mix doors is a slide door in which a plate door body part slides in a direction being applied by its own weight. The second air mix door slides in a sliding direction inclined relative to a sliding direction of the first air mix door by an angle toward a horizontal direction.

17 Claims, 2 Drawing Sheets

(MAXHOT→MAXCOOL)

(MAXCOOL→MAXHOT)

(MAXHOT→MAXCOOL)

(MAXCOOL→MAXHOT)

AIR CONDITIONER FOR VEHICLE

CROSS REFERENCE TO RELATED APPLICATION

This application is based on and incorporates herein by reference Japanese Patent Application No. 2011-149862 filed on Jul. 6, 2011.

TECHNICAL FIELD

The present disclosure relates to an air conditioner for a vehicle, which includes a slide door for air mixing.

BACKGROUND

Conventionally, an air conditioner for a vehicle, which has a slide door for air mixing, is described in Patent Document 1 (JP 2000-043535 A). In the vehicle air conditioner, a warm air passage is provided so that air passes through a heater core via the warm air passage in an air conditioning unit. Moreover, cold air passages, which bypass the heater core, are provided at upper side and lower side of the warm air passage.

The vehicle air conditioner includes a first slide door and a second slide door. The first slide door opens or closes an upper part of the warm air passage and the cold air passage located at an upper side of the warm air passage. The second slide door opens or closes a lower part of the warm air passage and the cold air passage located at a lower side of the warm air passage.

These slide doors moves approximately in an up-down direction. Thus, these slide doors are highly affected by their own weights, and a necessary operation force to move these doors upward may be thereby increased.

When the slide door is arranged to slide in a direction near to a horizontal direction in order to reduce the necessary operation force, dust or the like contained in air is likely to be accumulated in a groove which guides the sliding motion of the slide door.

SUMMARY

According, to an aspect of the present disclosure, an air conditioner for a vehicle includes a casing, a heating heat exchanger, a first air mix door and a second air mix door. The casing has therein a first air passage through which outside air flows toward a vehicle compartment, and a second air passage through which inside air flows toward the vehicle compartment in an inside-outside air double-layer mode. The heating heat exchanger is arranged in the first air passage to heat the outside air flowing in the first air passage, and is arranged in the second air passage to heat the inside air flowing in the second air passage. The first air mix door is arranged in the first air passage to adjust a ratio between a flow amount of the outside air passing through the heating heat exchanger and a flow amount of the outside air bypassing the heating heat exchanger. The second air mix door is arranged in the second air passage to adjust a ratio between a flow amount of the inside air passing through the heating heat exchanger and a flow amount of the inside air bypassing the heating heat exchanger. Each of the first air mix door and the second air mix door is a slide door in which a plate door body part slides in a direction being applied by its own weight. The second air mix door slides in a sliding direction inclined by an angle toward a horizontal direction relative to a sliding direction of the first air mix door.

Accordingly, accumulation of dust in a groove or the like which guides the air mix doors, and necessary operation force to slide the air mix doors can be reduced.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

An exemplar embodiment of the present disclosure will be described hereinafter referring to drawings.

Figure 1:
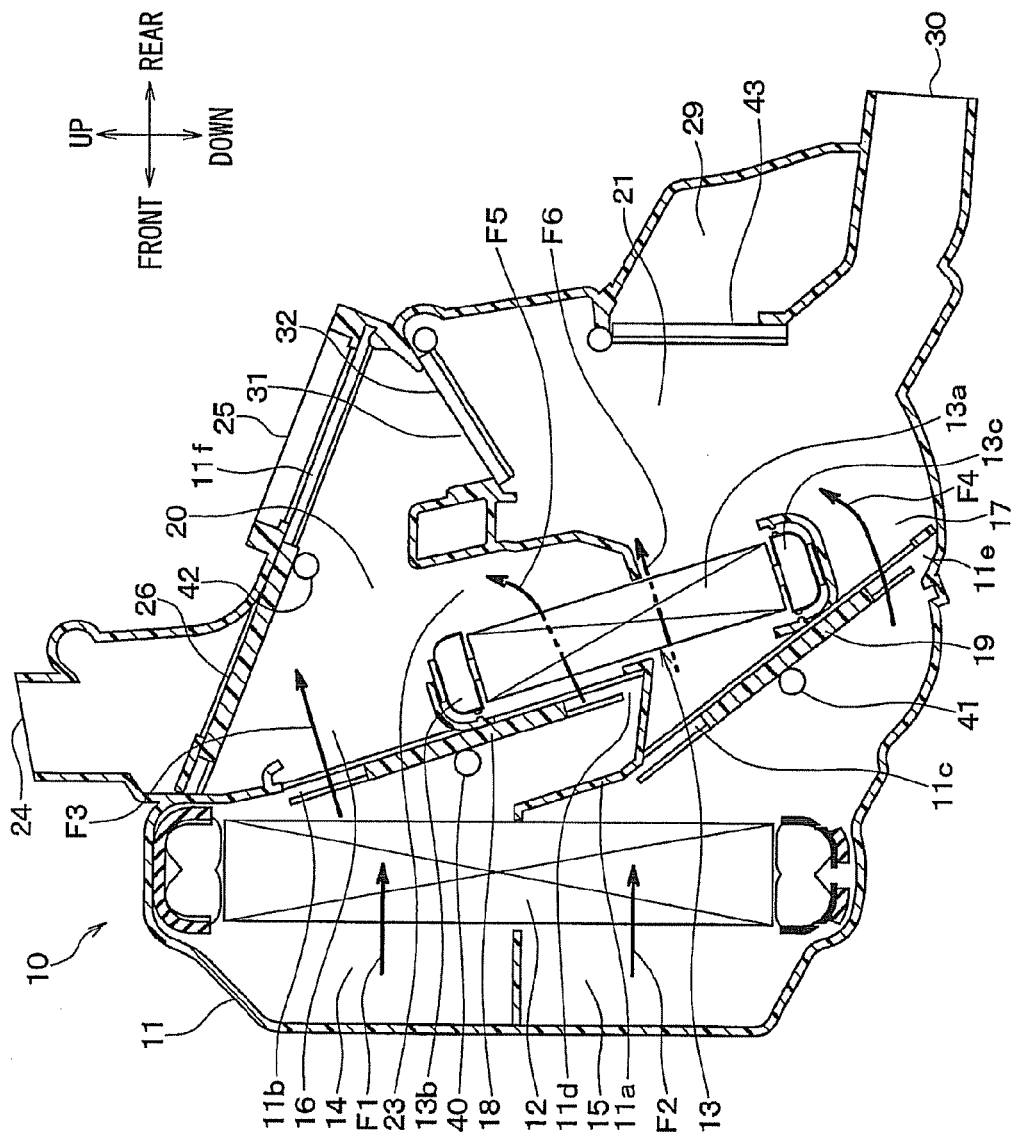
FIG. 1 is a schematic sectional view showing an air conditioning unit of an air conditioner for a vehicle, according to an exemplar embodiment of the present disclosure.

An air conditioner for a vehicle, according to the exemplar embodiment, includes an air conditioning unit 10 shown in FIG. 1. The up-down arrow and the front-rear arrow in FIG. 1 respectively indicate an up-down direction and a front-rear direction in a state in which the vehicle air conditioner is installed in the vehicle.

A ventilation system of the vehicle air conditioner generally includes a blower unit (not shown) and the air conditioning unit 10. The blower unit is arranged under an instrumental panel provided inside a compartment of the vehicle, and is located on a front passenger-seat side, away from a center in a right-left direction of the vehicle, i.e., in a direction perpendicular to a plane of the paper of FIG. 1. The air conditioning unit 10 is located approximately at the center in the right-left direction of the vehicle under the instrumental panel.

The blower unit includes an inside-outside air switching box and a blower, which are not shown in the drawings. The blower draws an air through the inside-outside air switching box, and blows the drawn air. The inside-outside air switching box has an inside air port through which inside air (i.e., air inside the vehicle compartment) is introduced into the inside-outside air switching box, and an outside air port through which outside air (i.e., air outside the vehicle compartment) is introduced into the inside-outside air switching box. The inside-outside air switching box includes an inside-outside air switching door which opens or closes both the inside air port and the outside air port. In the exemplar embodiment, the inside-outside air switching door is actuated by an electric actuator.

The blower includes a centrifugal fan, an actuation motor and a scroll casing. Specifically, the blower has two centrifugal fans and two scroll casings. An operation mode of the blower unit can be switched into an outside air mode in which only the outside air is blown, an inside air mode in which only the inside air is blown, and an inside-outside air double-layer mode in which the, outside air and the inside air are blown in two layers.

The air conditioning unit 10 includes an evaporator 12 used as an example of a cooling heat exchanger which cools air, and a heater core 13 used as an example of a heating heat exchanger which heats air. The evaporator 12 and the heater core 13 are accommodated in a single air conditioning casing 11 of the air conditioning unit 10. The air conditioning casing 11 is made of resin, which has a certain level of elasticity and is superior in strength, such as polypropylene.

Specifically, the air conditioning casing 11 is configured by multiple casings. After arranging, for example, the above-described heat exchangers 12, 13 and doors described later into the multiple casing, the multiple casings are integrated with each other by using a fastening member, such as a metal spring clip and a screw, so as to form the air conditioning unit 10.

The air conditioning casing 11 has two air inlets (not shown) in a surface of the air conditioning casing 11 at a most front side in the front-rear direction of the vehicle. The two air inlets correspond to the two scroll casings respectively. Outside air is introduced into both the two air inlets in the outside air mode, and inside air is introduced into both the two air inlets in the inside air mode. In the inside-outside air double-layer mode, outside air is introduced from one of the two scroll casings into a first air inlet of the two air inlets, and inside air is introduced from the other one of the two scroll casings into a second air inlet of the two air inlets.

The air conditioning unit 10 includes a partition plate 11a provided inside the air conditioning casing 11. The partition plate 11a divides an air passage in the air conditioning casing 11 into a first air passage 14 communicating with the first air inlet, and a second air passage 15 communicating with the second air inlet. Thus, air introduced from the first air inlet into the air conditioning casing 11 flows through the first air passage 14, and air introduced from the second air inlet into the air conditioning casing 11 flows through the second air passage 15. Therefore, in the inside-outside air double-layer mode, outside air flows through the first air passage 14, and inside air flows through the second air passage 15.

The partition plate 11a extends throughout the air conditioning casing 11 in the right-left direction of the vehicle. In the exemplar embodiment, the partition plate 11a is provided by molding integrally with the air conditioning casing 11.

The first air passage 14 is located above the partition plate 11a, and the second air passage 15 is located below the partition plate 11a, as shown in FIG. 1. Hence, the second air passage 15 is located at a lower side of the first air passage 14.

The evaporator 12 is arranged adjacent to the two air inlets of the air conditioning casing 11 inside the air conditioning casing 11. The evaporator 12 extends over an entire length of the air conditioning casing 11 approximately in the up-down direction of the vehicle. A dimension of the evaporator 12 in the right-left direction of the vehicle is set to be approximately equivalent to a dimension of the air conditioning casing 11 in the right-left direction of the vehicle.

The evaporator 12 is used as an example of the cooling heat exchanger which cools air by using a heat absorption effect of refrigerant flowing in a refrigerant cycle, and the evaporator 12 has a heat-exchange core part. The heat-exchange core part includes flat tubes through which refrigerant flows, and corrugated fins joined to the flat tubes.

The heat-exchange core part of the evaporator 12 penetrates through an insertion hole provided in the partition plate 11a. Thus, a part of the heat-exchange core part above the partition plate 11a is located in the first air passage 14, and a part of the heat-exchange core part below the partition plate 11a is located in the second air passage 15. Therefore, the upper part of the heat-exchange core part of the evaporator 12 cools air which flows in the first air passage 14 as shown by an arrow F1 in FIG. 1, and the lower part of the heat-exchange core part of the evaporator 12 cools air which flows in the second air passage 15 as shown by an arrow F2 in FIG. 1.

The heater core 13 is arranged at a position away from a downstream (rear) surface of the evaporator 12 by a predetermined distance in an air flow direction inside the air conditioning casing 11. The heater core 13 is located in a lower part of an inside of the air conditioning casing 11, and the heater core 13 is inclined slightly from the up-down direction of the vehicle. A dimension of the heater core 13 in the right-left direction is set to be approximately equal to the dimension of the air conditioning casing 11 in the right-left direction.

The heater core 13 is used as an example of the heating heat exchanger which reheats cold air having passed through the evaporator 12, and the heater core 13 includes a heat-exchange core part 13a. The heat-exchange core part 13a includes multiple flat tubes through which high-temperature engine coolant (heat-exchange medium) flows, and corrugated fins joined to the flat tubes.

The heater core 13 further includes an upper tank 13b arranged at an upper side of the heat-exchange core part 13a, and a lower tank 13c arranged at a lower side of the heat-exchange core part 13a. These two tanks 13b and 13c are used to distribute the multiple tubes to the heat-exchange core part 13a and to receive the engine coolant from the multiple tubes.

The heat-exchange core part 13a of the heater core 13 penetrates through an insertion hole provided in the partition plate 11a. A part of the heat-exchange core part 13a above the partition plate 11a is located in the first air passage 14, and a part of the heat-exchange core part 13a below the partition plate 11a is located in the second air passage 15. In order to arrange the heater core 13 as described above, the partition plate 11a is bent between the evaporator 12 and the heater core 13 to partition the first air passage 14 and the second air passage 15 from each other therebetween, as shown in FIG. 1.

Therefore, the upper part of the heat-exchange core part 13a heats an air which flows in the first air passage 14 as shown by an arrow F5, and the lower part of the heat-exchange core part 13a heats air which flows through the second air passage 15 as shown by an arrow F6.

In the first air passage 14, a first bypass passage 16 is provided above the heater core 13, and a part of cold air having passed through the evaporator 12 flows through the first bypass passage 16 to bypass the heater core 13 as shown by an arrow F3 in FIG. 1.

In the second air passage 15, a second bypass passage 17 is provided below the heater core 13, and a part of cold air having passed through the evaporator 12 flows through the second bypass passage 17 to bypass the heater core 13 as shown by an arrow F4 in FIG. 1.

The air conditioning unit 10 further includes first and second air mix doors 18, 19 as an example of a temperature adjusting portion which adjusts a temperature of air flowing toward the vehicle compartment. The first and second air mix doors 18, 19 are arranged between the evaporator 12 and the heater core 13 inside the air conditioning casing 11. The first air mix door 18 adjusts a ratio between a flow amount of warm air, which is heated in the upper part of the heat-exchange core part 13a of the heater core 13 as shown by the arrow F5, and a flow amount of cold air, which bypasses the heater core 13 through the first bypass passage 16 as shown by the arrow F3.

The warm air flowing out of the upper part of the heat-exchange core part 13a of the heater core 13 as shown by the arrow F5 and the cold air flowing out of the first bypass passage 16 as shown by the arrow F3 are mixed with each other in a first air mixing area 20 inside the air conditioning casing 11, so that a temperature of the mixed air is adjusted to be a desired temperature.

The second air mix door 19 adjusts a ratio between a flow amount of warm air, which is heated in the lower part of the heat-exchange core part 13a of the heater core 13 as shown by the arrow F6, and a flow amount of cold air, which bypasses the heater core 13 through the second bypass passage 17 shown by the arrow F4.

The warm air flowing out of the lower part of the heat-exchange core part 13a of the heater core 13 as shown by the arrow F6 and the cold air flowing out of the second bypass passage 17 as shown by the arrow F4 are mixed with each other in a second air mixing area 21 inside the air conditioning casing 11, so that a temperature of the mixed air is adjusted to be a desired temperature.

The first and second air mix doors 18, 19 are slide doors which move approximately parallel to a front surface of the heater core 13. Each of the first and second air mix doors 18, 19 includes a plate-like door body part and a rack part which are integrated with each other.

The rack part of the first air mix door 18 meshes with a pinion (not shown) provided on a first shaft 40, and the first shaft 40 is actuated and rotated by an electric actuator (not shown). The rotation motion of the first shaft 40 is converted into a slide motion of the first air mix door 18, and a position of the first air mix door 18 within a slide range of the first air mix door 18 is thereby adjusted.

Similarly to the first air mix door 18, the rack part of the second air mix door 19 meshes with a pinion (not shown) provided on a second shaft 41, and the second shaft 41 is actuated and rotated by an electric actuator (not shown). The rotation motion of the second shaft 41 is converted into a slide motion of the second air mix door 19, and a position of the second air mix door 19 within a slide range of the second air mix door 19 is thereby adjusted.

The first and second shafts 40, 41 extend in the right-left direction of the vehicle, and are rotatably supported by lateral sides of the air conditioning casing 11. One end portion of each of the first and second shafts 40, 41 penetrates through a lateral wall of the air conditioning casing 11, and is linked to the electric actuator outside the air conditioning casing 11.

The air conditioning casing 11 has a sealing wall surface (not shown) therein, and the first and second air mix doors 18, 19 are pressed by a wind pressure against the sealing wall surface to shut an air flow.

Both end portions of the first air mix door 18 in the right-left direction of the vehicle are inserted into a first guide groove 11b provided in the lateral sides of the air conditioning casing 11. Both end portions of the second air mix door 19 in the right-left direction of the vehicle are inserted into a second guide groove 11c provided in the lateral sides of the air conditioning casing 11.

Each of the first and second guide groove 11b, 11c is a pair of opposed walls protruding (extending) linearly from the lateral side of the air conditioning casing 11 inward of the air conditioning casing 11.

The first guide groove 11b extends approximately parallel to a surface perpendicular to a flow direction of air flowing into the heater core 13. In other words, the first guide groove 11b extends approximately in the up-down direction. The first guide groove 11b guides the first air mix door 18 such that the first air mix door 18 moves (slides) approximately parallel to the surface perpendicular to the flow direction of air flowing into the heater core 13. In other words, the first air mix door 18 guided by the first guide groove 11b moves (slides) approximately in the up-down direction.

The second guide groove 11c is inclined so that the second guide groove 11c is larger in inclination angle from the up-down direction than the first guide groove 11b. Thus, the second guide groove 11c guides the air mix door 19 such that the air mix door 19 moves (slides) in a direction inclined toward a horizontal direction from a moving (sliding) direction of the air mix door 18. More specifically, the second guide groove 11c is inclined, so that a lower end part of the second guide groove 11c is positioned at a rear side of an upper end part of the second guide groove 11c in the front-rear direction of the vehicle. In other words, the lower end part of the second guide groove 11c is located on an upstream side of the upper end part of the second guide groove 11c in an air flow direction. The lower end part of the second guide groove 11c is located directly below the heater core 13.

Moreover, the lower end part of the second guide groove 11c is positioned at a rear side of the first guide groove 11b in the front-rear direction of the vehicle. In other words, the lower end part of the second guide groove 11c is located downstream than the first guide groove 11b in the air flow direction.

A lower end part of the first guide groove 11b is located at a rear side of the upper end part of the second guide groove 11c in the front-rear direction of the vehicle. In other words, the lower end part of the first guide groove 11b is nearer to the heater core 13 than the upper end part of the second guide groove 11c in the front-rear direction of the vehicle. Additionally, the lower end part of the first guide groove 11b is located lower than the upper end part of the second guide groove 11c in the up-down direction of the vehicle. Therefore, a part of the partition plate 11a, between the upper end part of the second guide groove 11c and the lower end part of the first guide groove 11b, extends rearward and downward.

The heater core 13 is same as the second guide groove 11c in inclination direction, and a part of the heater core 13 is located directly above the second guide groove 11c. The lower end of the heater core 13 contacts the second guide groove 11 at a rear side.

The heater core 13 may extend in the vertical direction, or an upper part of the heater core 13 may be inclined upstream in the air flow direction from the vertical direction by a first angle. The first air mix door 18 may extend in the vertical direction, or an upper part of the first air mix door 18 may be inclined upstream in the air flow direction from the vertical direction by a second angle. The first and second air mix doors 18, 19 are located at an upstream side of the heating heat exchanger 13 in the air flow direction. The second air mix door 19 is located lower than the first air mix door 18, and an upper part of the second air mix door 19 is inclined upstream from the vertical direction by a third angle which is larger than either the first angle or the second angle. The lower end position of the second air mix door 19 within the slide range thereof is located directly below a lower end of the heating heat exchanger 13.

The first guide groove 11b has a cutout 11d to discharge dust accumulated in the first guide groove 11b. For example, the cutout 11d is provided at a lower end part of an upstream (front) one of the pair of opposed walls of the first guide groove 11b.

The second guide groove 11c has a cutout 11e to discharge dust accumulated in the second guide groove 11c. For example, the cutout 11e is provided at a lower end part of an upstream (front) one of the pair of opposed walls of the second guide groove 11c.

A part of the partition plate 11a located downstream (at a rear side) of the heater core 13 in the air flow direction extends rearward and upward to define a warm air passage 23. Thus, warm air having passed through the heater core 13 flows upward through the warm air passage 23. A downstream (upper) side of the warm air passage 23 and a downstream side of the first bypass passage 16 communicates with each other above the heater core 13. The communication area between the warm air passage 23 and the first bypass passage 16 is the above-described first air mixing area 20, in which warm air and cold air are mixed with each other.

The air conditioning casing 11 has a defroster opening portion 24 in an upper surface of the air conditioning casing 11, and the defroster opening portion 24 is located adjacent to the first air mixing area 20. The defroster opening portion 24 is connected via a defroster duct (not shown) to a defroster outlet. A part of a conditioned air, which is adjusted in temperature in the first air mixing area 20, is introduced into the defroster opening portion 24, and is blown toward an inner surface of a windshield of the vehicle from the defroster outlet.

The air conditioning casing 11 has a face opening portion 25 in the upper surface of the air conditioning casing 11, and the face opening portion 25 is located at a rear side of the defroster opening portion 24. Hence, the face opening portion 25 is nearer to a passenger than the defroster opening portion 24 in a passenger compartment (vehicle compartment). The face opening portion 25 is connected via a face duct (not shown) to a face outlet arranged above the instrumental panel. A part of conditioned air temperature-adjusted in the first air mixing area 20 is introduced into the face opening portion 25, and is blown toward a head area of a passenger sitting on a front seat of the vehicle compartment from the face outlet.

The defroster opening portion 24 and the face opening portion 25 are selectively opened or closed by a face door 26 (opening portion door). The face door 26 is a slide door, which is arranged in vicinity to the upper surface of the air conditioning casing 11 and slides approximately in the horizontal direction.

The face door 26 includes a plate-like door body part and a rack part, which are integrated with each other. The rack part of the face door 26 meshes with a pinion (not shown) provided on a shaft 42, and the shaft 42 is actuated and rotated by an electric actuator mechanism (not shown), so that a position of the face door 26 within a slide range thereof is adjusted.

The shaft 42 extends in the right-left direction of the vehicle, and is rotatably supported by the lateral sides of the air conditioning casing 11. One end portion of the shaft 42 penetrates through the lateral wall of the air conditioning casing 11, and is linked to an electric actuator (not shown) outside the air conditioning casing 11.

Both end portions of the face door 26 in the right-left direction of the vehicle are inserted into a guide groove 11*f* provided in the lateral sides of the air conditioning casing 11. The guide groove 11*f* is a pair of opposed walls protruding from the lateral side of the air conditioning casing 11 inward of the air conditioning casing 11.

The guide groove 11*f* extends approximately in the horizontal direction, and guides the face door 26 such that the face door 26 moves (slides) approximately in the horizontal direction. In the example of FIG. 1, the rear side of the guide groove 11*f* is inclined lower slightly from the horizontal direction.

The air conditioning casing 11 has a sealing wall surface (not shown) therein, and the face door 26 is pressed by a wind pressure against the sealing wall surface to shut an air flow.

The air conditioning casing 11 has a foot opening portion 29 in a rear part of the air conditioning casing 11, and the foot opening portion 29 is provided adjacent to the second air mixing area 21. The foot opening portion 29 opens on both sides of the air conditioning casing 11 in the right-left direction of the vehicle. A part of conditioned air, which is adjusted in temperature in the second air mixing area 21, is introduced into the foot opening portion 29, and is blown toward a foot area of a passenger sitting on the front seat via foot outlets (not shown) provided both sides of the vehicle compartment in the right-left direction of the vehicle.

A foot door 43 is arranged in the rear part of the air conditioning casing 11 to open or close the foot opening portion 29. The food door 43 is turned with respect to a rotary shaft extending in the right-left direction of the vehicle, and the foot door 43 is linked to an electric actuator (not shown) to be controlled and rotated by the actuator mechanism.

The air conditioning casing 11 further has a rear-seat opening portion 30 in the rear part of the air conditioning casing 11, and the rear-seat opening portion 30 is located below the foot opening portion 29. A part of the conditioned air, which is adjusted in temperature in the second air mixing area 21, is introduced into the rear-seat opening portion 30, and flows through a connection duct (not shown) to be blown from a rear-seat face outlet (not shown) or from a rear-seat foot outlet (not shown) toward a head area or a foot area of a passage sitting on a rear seat of the vehicle. The rear-seat opening portion 30 is opened or closed by a rear-seat door (not shown).

The partition plate 11*a* extends to a rear-side wall surface of the air conditioning casing 11 in the front-rear direction of the vehicle so as to separate the first air mixing area 20 from the second air mixing area 21. A rear end portion of the partition plate 11*a* in the front-rear direction of the vehicle has a face-foot port 31 through which the first air mixing area 20 communicates with the second air mixing area 21.

A face-foot communication door 32 is arranged in the rear part of the air conditioning casing 11 to open or close the face-foot port 31. The face-food door 32 is turned with respect to a rotary shaft extending in the right-left direction of the vehicle, and the face-foot communication door 32 is linked to an electric actuator (not shown) to be controlled and rotated by the actuator mechanism.

The face door 26, the foot door 43, and the face-foot communication door 32 are used as examples of an air outlet mode changing portion which changes an air outlet mode, i.e., open/close states of the air outlets, such as the defroster outlet, the face outlet and the foot outlet. The air outlet mode includes a face mode in which conditioned air is blown toward the head area of the passenger in the vehicle compartment from the face outlet by fully opening the face outlet, a bi-level mode in which conditioned air is blown toward the head area and the foot area of the passenger in the vehicle compartment by opening both the face outlet and the foot outlet, and a foot mode in which conditioned air is blown mainly from the foot outlet by fully opening the foot outlet and slightly opening the defroster outlet. When the passenger controls the switches of the control panel, the air outlet mode can be switched to a defroster mode in which conditioned air is blown toward the inner surface of the windshield of the vehicle from the defroster outlet by fully opening the defroster outlet.

Next, an electrical control portion of the vehicle air conditioner according to the exemplar embodiment will be described. The vehicle air conditioner is automatically controlled by a non-shown air conditioning controller (control portion).

The air conditioning controller has an electronic control unit (ECU) including a microcomputer, and controls various air conditioning components provided with the above-described blower unit and the air conditioning unit 10 based on a preset program. The air conditioning controller receives an electric power from an in-vehicle battery (not shown) when an ignition switch of the engine of the vehicle is turned ON.

The air conditioning controller receives sensor signals from a sensor group (not shown), and control signals from an air-conditioning control panel (not shown).

The sensor group includes an outside temperature sensor which detects a temperature Tam outside the vehicle compartment, an inside temperature sensor which detects a temperature Tr inside the vehicle compartment, a solar radiation sensor which detects a solar radiation amount Ts entering into the vehicle compartment, an evaporator temperature sensor which detects a temperature Te of air flowing out of the evaporator 12, and a coolant temperature sensor which detects a temperature Tw of coolant flowing into the heater core 13.

The air-conditioning control panel has a temperature setting switch used for setting a preset temperature Tset, an air outlet mode setting switch, an inside-outside air mode setting switch, and an-air conditioning mode setting switch.

Next, an actuation device of the various air conditioning components controlled by the air conditioning controller includes an actuation motor for the above-described inside-outside air switching door, an actuation motor for the blower of the blower unit, and actuation motors of the actuator mechanisms for various doors. Here, the various doors actuated by the actuator mechanisms includes the first and second air mix doors 18, 19, the face door 26, the face-foot communication door 32, the foot door 43, and the rear-seat door.

Next, an operation of the vehicle air conditioner of the exemplar embodiment will be described. In the vehicle air conditioner of the exemplar embodiment, the air conditioning controller performs an air-conditioning control program stored in a memory circuit of the air conditioning controller when an activation signal is inputted to the vehicle air conditioner from the control panel in an activated state of the vehicle.

In the air-conditioning control program, the air conditioning controller reads in detection signals outputted from the above-described sensor group and control signals outputted from the control panel. Based on the signals, the air conditioning controller calculates a target outlet air temperature TAO, which is a target temperature of air blown into the vehicle compartment.

Specifically, the target outlet air temperature TAO is calculated by using a following formula E1.

$$TAO = Kset \times Tset - Kr \times Tr - Kam \times Tam - Ks \times Ts + C \tag{E1}$$

Here, Tset is a preset temperature in the vehicle compartment set by using the temperature setting switch of the control panel, Tr is an inside temperature detected by the inside temperature sensor, Tam is an outside temperature detected by the outside temperature sensor, Ts is a solar radiation amount detected by the solar radiation sensor, Kset, Kr, Kam and Ks are control gains, and C is a constant value for correction.

Additionally, the air conditioning controller determines a control state of the actuation motor used for the blower of the blower unit, and determines control states of various electric actuators of the air conditioning unit 10. Subsequently, the air conditioning controller outputs control signals to the various electric actuators so that the determined control states, are obtained. The air conditioning controller repeats a routine: reading in detection signals and control signals→calculating the target outlet air temperature TAO→determining control states→outputting control signals.

For example, the control state of the electric actuation motor for the blower of the blower unit is determined based on the target outlet air temperature TAO by using a control map stored in the memory circuit. Specifically, an air blowing amount of the blower is controlled to be approximately a largest amount by outputting a largest control voltage to the electric actuation motor when the target outlet air temperature TAO is determined to be within an extremely low temperature range (max cooling range) or within an extremely high temperature range (max heating range). The air blowing amount of the blower is reduced in accordance with shift of the target outlet air temperature TAO from the extremely high range to a middle temperature range or from the extremely low temperature range to the middle temperature range.

Control states of the electric actuators for the first and second air mix doors 18, 19 are determined so that an open degree of the first and second air mix doors 18, 19 becomes a target open degrees SW. Specifically, the target open degree SW is calculated by using a following formula E2.

$$SW = [(TAO - Te)/(Tw - Te)] \times 100(\%) \tag{E2}$$

Here, Te is a temperature of air flowing out of the evaporator 12 detected by the evaporator temperature sensor, and Tw is an engine coolant temperature detected by the coolant temperature sensor.

When SW=100(%), the first and second air mix doors 18, 19 are positioned to be in a MAXHOT state. In the MAXHOT state, as shown in FIG. 2A, the first and second bypass passages 16, 17 are fully closed, and an air passage of the heater core 13 is fully open.

When SW=0(%), the first and second air mix doors 18, 19 are positioned to be in a MAXCOOL state. In the MAXCOOL state, as shown in FIG. 2B, the first and second bypass passages 16, 17 are fully open, and the air passage of the heater core 13 is fully closed.

Figure 2A:
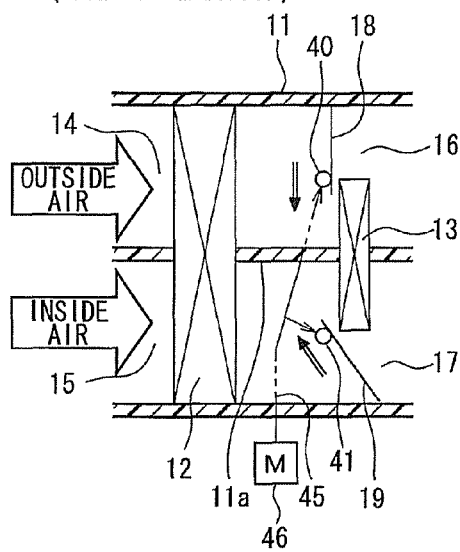
FIG. 2A is a schematic sectional diagram showing operation states of air mix doors for the air conditioner according to the exemplar embodiment.

As shown in FIG. 2A, the first air mix door 18 and the second air mix door 19 may be actuated by a common actuation mechanism to be operatively linked with each other. For example, the common actuation mechanism includes a link mechanism 45 connected to the first and second shafts 40, 41, and an electric actuator 46 which actuates the first and second air mix doors 18, 19 via the link mechanism 45.

Figure 2B:
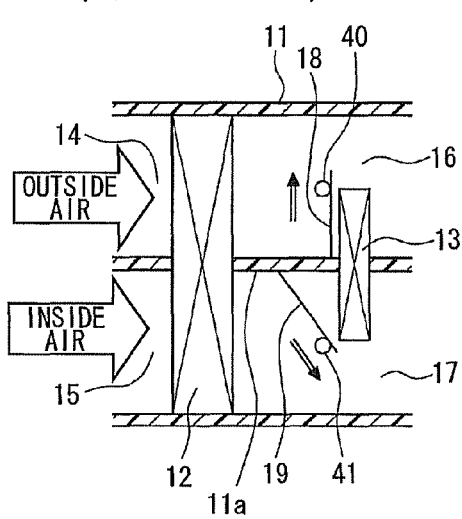
FIG. 2B is a schematic sectional diagram showing operation states of the air mix doors for the Or conditioner according to the exemplar embodiment.

In the exemplar embodiment, as shown by arrows in FIGS. 2A and 2B, the actuation mechanism 45, 46 actuates the first and second air mix doors 18, 19 together. When the first air mix door 18 moves downward, the second air mix door 19 moves upward, as shown by the two arrows in FIG. 2A. When the first air mix door 18 moves upward, the second air mix door 19 moves downward, as shown by the two arrows in FIG. 2B.

A control state of the electric actuator for the inside-outside air switching door of the blower unit is determined based on the target outlet air temperature TAO by using a control map stored in the air conditioning controller.

In the exemplar embodiment, the outside air mode is generally selected. When a largest air heating capacity of the vehicle air conditioner is required, in other words, when the target outlet air temperature TAO is determined to be within the extremely low temperature range, the inside air mode is selected. When a largest air cooling capacity of the vehicle air conditioner is required, in other words, when the target outlet air temperature. TAO is determined to be within the extremely high temperature range, the inside-outside air double-layer mode is selected.

A control state of the electric actuator for the air outlet changing portion is determined based on the target outlet air temperature TAO. For example, the air outlet mode is changed in this order, the face mode→the bi-level mode→the foot mode, in accordance with shift of the target outlet air temperature TAO from a low temperature range to a high temperature range.

Hence, the face mode is selected mainly when air to be blown into the vehicle compartment is cooled in a summer season, in other words, mainly when the target outlet temperature TAO is set to be within the low temperature range. The bi-level mode is selected mainly in spring and autumn seasons, in other words, mainly when the target outlet temperature TAO is set to be within a middle temperature, range. The foot mode is selected mainly when, air to be blown into the vehicle compartment is heated in a winter season, in other words, mainly when the target outlet temperature TAO is set to be within the high temperature range.

Additionally, the air outlet mode may be set to be the defroster mode when the windshield is determined to be in a state, where a possibility to be fogged is high, based on a detection value from a humidity sensor provided in the vehicle compartment.

In the inside-outside air double-layer mode of the exemplar embodiment, outside air flows through the first air passage 14, and inside air flows through the second air passage 15. Here, an amount of impurities, such as dust, contained in the outside air is generally larger than an amount of impurities contained in the inside air.

Thus, the first guide groove 11*b*, which guides the first air mix door 18, is likely to accumulate the dust or the like therein as compared to the second guide groove 11*c* which guides the second air mix door 19.

In the exemplar embodiment, the first guide groove 11*b*, which guides the first air mix door 18, extends approximately in the up-down direction, i.e., approximately in a vertical direction perpendicular to the horizontal direction, and the cutout 11*d* is provided at the lower end part of the first guide groove 11*b*. Therefore, the accumulated dust or the like can be easily discharged from the cutout 11*d* by using a gravity force.

The second guide groove 11*c*, which guides the second air mix door 19, is not likely to accumulate the dust or the like therein as compared to the first guide groove 11*b*. Thus, in the exemplar embodiment, the second guide groove 11*c* is inclined toward the horizontal direction relative to the extending direction of the first guide groove 11*b*, and an influence of its own weight on the second air mix door 19 can be thereby reduced when the second air mix door 19 slides. Accordingly, a necessary operation force to slide the second air mix door 19 can be reduced.

As a result, in the exemplar embodiment, both the accumulation of dust and the necessary operation force can be reduced.

By reducing the necessary operation force to slide the second air mix door 19, a requisite strength of the second air mix door 19 can be reduced. Thus, the second air mix door 19 can be thinned and miniaturized, and a configuration of an additional strengthening, such as a rib for the second air mix door 19 can be simplified. Consequently, a cost of materials or the like for the second air mix door 19 can be reduced.

Furthermore, as shown in FIGS. 2A and 2B, because the common actuation mechanisms 45, 46 actuates the first air mix door 18 and the second air mix door 19 together, a total necessary operation force to slide the first and second air mix doors 18, 19 can be reduced.

Figure 3A:
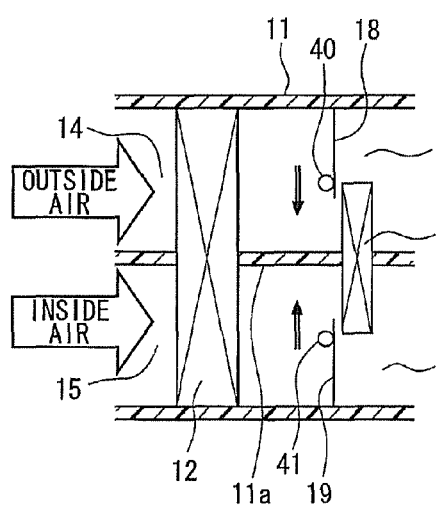
FIG. 3A is a schematic sectional diagram showing operation states of air mix doors for an air conditioner according to a comparative example.
Figure 3B:
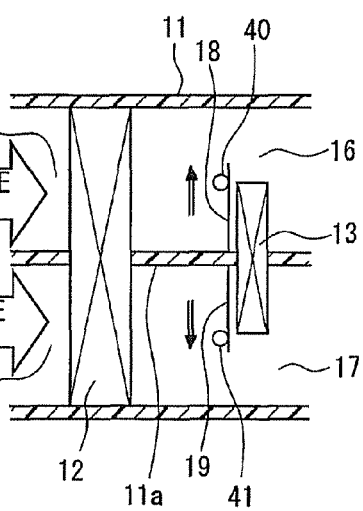
FIG. 3B is a schematic sectional diagram showing operation states of the air mix doors for the air conditioner according to the comparative example.

FIGS. 3A and 3B show a comparative example in which, first and second air mix doors 18, 19 slide in the vertical direction. In FIG. 3A, the two arrows show sliding directions of the first and second air mix doors 18, 19 when a state of the first and second air mix doors 18, 19 are shifted from the MAXHOT state to the MAXCOOL state. In FIG. 3B, the two arrows show sliding directions of the first and second air mix doors 18, 19 when the state of the first and second air mix doors 18, 19 are shifted from the MAXCOOL state to the MAXHOT state.

In the comparative example, these two air mix doors 18, 19 are approximately same with each other in their body sizes and in their sliding directions, thereby being approximately same with each other in their own weights affecting them. Therefore, in both cases shown in FIG. 3A and in FIG. 3B, influence of their own weights on the total necessary operation force to slide the first and second air mix doors 18, 19 comes out even.

On the other hand, in the exemplar embodiment, as shown in FIGS. 2A and 2B, the sliding direction of the second air mix door 19 is inclined toward the horizontal direction relative to the sliding direction of the first air mix door 18. Hence, an influence of a weight of the second air mix door 19 on the necessary operation force to slide the second air mix door 19 is smaller than an influence of a weight of the first air mix door 18 on a necessary operation force to slide the first air mix door 18.

Thus, when the MAXHOT state is shifted to the MAXCOOL state as shown in FIG. 2A, the influence of their own weights on the total necessary operation force to slide the first and second air mix doors 18, 19 can be reduced as compared to the comparative example.

Here, a coefficient of static friction is larger than a coefficient of dynamic friction. Moreover, a pressure difference between a front side and a rear side of the slide doors 18, 19 is larger in the MAXHOT state than in the MAXCOOL state because air flows through the heater core 13 in the MAXHOT state. Therefore, the total necessary operation force is largest at a start time of shifting of the first and second doors 18, 19 from the MAXHOT state to the MAXCOOL state.

By reducing the total necessary operation force at a time of the shift from the MAXHOT state to the MAXCOOL state, the total necessary operation force can be reduced as a whole.

In the exemplar embodiment, the heater core 13 is arranged at a rear side of the first and second air mix doors 18, 19 in the front-rear direction of the vehicle, in other words, the heater core 13 is arranged on one side in the horizontal direction with reference to positions of the first and second air mix doors 18, 19 in the horizontal direction. The sliding direction of the second air mix door 19 is inclined so that an upper end position of the second air mix door 19 within the slide range thereof is located at a front side of a lower end position of the second air mix door 19 within the slide range thereof in the front-rear direction of the vehicle. In other words, the upper end position of the second air mix door 19 is farther to the heater core 13 than the lower end position of the second air mix door 19 in the front-rear direction of the vehicle. The upper end position of the second air mix door 19 is located on the other side in the horizontal direction with reference to the lower end position of the second air mix door 19. The lower end position of the second air mix door 19 within the slide range thereof is located at a rear side of the slide range of the first air mix door 18 in the front-rear direction of the vehicle. In other words, the lower end position of the second air mix door 19 within the slide range thereof is located on the one side in the horizontal direction with reference to the slide range of the first air mix door 18. The lower end position of the second air mix door 19 is located directly under the heater core 13. The heater core 13 is inclined in a direction same as the inclination direction of the second air mix door 19. Thus, an upper end of the heater core 13 is located at a front side of a lower end of the heater core 13 in the front-rear direction of the vehicle. At least a part of the heater core 13 is located directly above the slide range of the second air mix door 19. As a result, a body size of the air conditioning unit 10 in the front-rear direction of the vehicle (in the horizontal direction) can be reduced.

Moreover, a lower end position of the first air mix door 18 within the slide range thereof is located at rear side of the upper end position of the second air mix door 19 within the slide range thereof. In other words, the lower end position of the first air mix door 18 is nearer to the heater core 13 than the upper end position of the second air mix door 19 in the front-rear direction of the vehicle. Additionally, the lower end position of the first air mix door 18 is located lower than the upper end position of the second air mix door 19 in the up-down direction of the vehicle. Therefore, a body size of the air conditioning unit 10 in also the up-down direction of the vehicle can be reduced.

In the exemplar embodiment, the first shaft 40 is arranged in vicinity to the upper tank 13b of the heater core 13, and the second shaft 41 is arranged in vicinity to the lower tank 13c of the heater core 13. Thus, an air flow through the heat-exchange core part 13a of the heater core 13 can be prevented from being interrupted by the first shaft 40 and the second shaft 41.

Although the present disclosure has been fully described in the exemplar embodiment with reference to the accompanying drawings, it is to be noted that various changes and modifications will become apparent to those skilled in the art.

For example, a shape of each of the door body parts of the air mix doors 18, 19 and a shape of each of the guide grooves 11d, 11e are not limited to the plate-like shape or the linear shape shown in FIG. 1, and may be a circular-arc shape, for example.

The door body parts of the air mix doors 18, 19 are not limited to be rigid, and may be flexible.

The air conditioner of the above embodiments may be described below.

The air conditioner for a vehicle includes the casing 11, the heater core 13 as a heating heat exchanger, the first air mix door 18 and the second air mix door 19. The casing 11 has therein the first air passage 14 through which outside air flows toward the vehicle compartment, and the second air passage 15 through which inside air flows toward the vehicle compartment in the inside-outside air double-layer mode. The heating heat exchanger (13) is arranged in the first air passage 14 to heat the outside air flowing in the first air passage 14, and is arranged in the second air passage 15 to heat the inside air flowing in the second air passage 15. The first air mix door 18 is arranged in the first air passage 14 to adjust a ratio between a flow amount of the outside air passing through the heating heat exchanger (13) and a flow amount of the outside air bypassing the heating heat exchanger (13). The second air mix door 19 is arranged in the second air passage 15 to adjust a ratio between a flow amount of the inside air passing through the heating heat exchanger (13) and a flow amount of the inside air bypassing the heating heat exchanger (13). Each of the first air mix door 18 and the second air mix door 19 is the slide door in which the plate door body part slides in the direction being applied by its own weight. The second air mix door 19 slides in the sliding direction inclined by an angle toward the horizontal direction relative to the sliding direction of the first air mix door 18.

Because the sliding direction of the second air mix door 19 is inclined from the sliding direction of the first air mix door 18 toward the horizontal direction, an influence of own weight on the second air mix door 19 can be reduced, and the necessary operation force to slide the second air mix door 19 can be thereby reduced.

Moreover, the second air mix door 19 is arranged in the second air passage 15 through which the inside air flows, the second air mix door 19 is not likely to accumulate dust or the like contained in the outside air as compared to the first air mix door 18. Therefore, even though the second air mix door 19 extends in a direction relatively near the horizontal direction, an influence of the dust or the like on the movement of the second air mix door 19 can be reduced. As a result, both the influence of the accumulation of the dust or the like and the necessary operation force can be reduced.

The air conditioner may include the actuation mechanism 45, 46 configured to actuate and operatively link the first air mix door 18 and the second air mix door 19, so that the first air mix door 18 slides downward when the second air mix door 19 slides upward.

In this case, when the first air mix door 18 moves downward, the necessary operation force to move the first air mix door 18 is reduced by an effect of its own weight, and the necessary operation force to move the second air mix door 19 is increased by an effect of its own weight. Here, the second air mix door 19 is inclined to extend in the direction relatively near the horizontal direction. Thus, the effect of own weight on the movement of the second air mix door 19 can be reduced. Consequently, the total necessary operation force to slide the first and second air mix doors 18, 19 can be reduced.

The second air passage 15 may be located at a lower side of the first air passage 14. The air conditioner may further include the first bypass passage 16 and the second bypass passage 17. The first bypass passage 16 is provided at an upper side of the heating heat exchanger (13) in the first air passage 14 to let the outside air bypass the heating heat exchanger (13). The second bypass passage 17 is provided at a lower side of the heating heat exchanger (13) in the second air passage 15 to let the inside air bypass the heating heat exchanger (13).

The heating heat exchanger (13) may be located on one side in the horizontal direction with reference to positions of the first and second air mix doors 18, 19. The lower end position of the second air mix door 19 within the slide range of the second air mix door 19 may be located on the one side in the horizontal direction, and the upper end position of the second air mix door 19 within the slide range of the second air mix door 19 may be located on the other side in the horizontal direction. The lower end position of the second air mix door 19 within the slide range thereof may be located on the one side in the horizontal direction with reference to the slide range of the first air mix door 18. The heating heat exchanger (13) may be inclined relative to the vertical direction toward the second air mix door 19. The heating heat exchanger (13) may have a part located directly above the slide range of the second air mix door 19.

In the case of the above configuration, the casing 11 can be miniaturized in the horizontal direction.

The lower end position of the first air mix door 18 within the slide range of the first air mix door 18 may be located on the one side in the horizontal direction with reference to the upper end position of the second air mix door 19, and the lower end position of the first air mix door 18 may be located at the lower side of the upper end position of the second air mix door 19 in the vertical direction.

In this case, the casing 11 can be miniaturized in the vertical direction.

The heating heat exchanger (13) may include the heat-exchange core part 13a having the plurality of tubes through which a heat-exchange medium flows, and the pair of tanks 13a, 13b which distribute the heat-exchange medium to the plurality of tubes of the heat-exchange core part 13a and receive the heat-exchange medium from the plurality of tubes. The pair of tanks 13a, 13b are the upper tank 13b arranged at the upper end of the heat-exchange core part 13a, and the lower tank 13c arranged at the lower end of the heat-exchange core part 13a. The air conditioner may further include the first shaft 40 and the second shaft 41. The first shaft 40 is configured to be rotatable and to transform the movement of the first shaft 40 to the sliding movement of the first air mix door 18. The second shaft 41 is configured to be rotatable and to transform the movement of the second shaft 41 to the sliding movement of the second air mix door 19. The first shaft 40 is arranged adjacent to the upper tank 13b, and the second shaft 41 is arranged adjacent to the lower tank 13c.

In this case, air flow interruption at the heating heat exchanger (13) due to the first and second shafts 40, 41 can be limited.

Additional advantages and modifications will readily occur to those skilled in the art. The disclosure in its broader terms is therefore not limited to the specific details, representative apparatus, and illustrative examples shown and described.

What is claimed is:

1. An air conditioner for a vehicle comprising:
   a casing having therein a first air passage through which outside air flows toward a vehicle compartment, and a second air passage through which inside air flows toward the vehicle compartment in an inside-outside air double-layer mode;
   a heating heat exchanger arranged in the first air passage to heat the outside air flowing in the first air passage, and arranged in the second air passage to heat the inside air flowing in the second air passage;
   a partition plate disposed upstream of the heating heat exchanger in an air flow direction and separating the first air passage and the second air passage;
   a first air mix door arranged in the first air passage to adjust a ratio between a flow amount of the outside air passing through the heating heat exchanger and a flow amount of the outside air bypassing the heating heat exchanger; and
   a second air mix door arranged in the second air passage to adjust a ratio between a flow amount of the inside air passing through the heating heat exchanger and a flow amount of the inside air bypassing the heating heat exchanger, wherein each of the first air mix door and the second air mix door is a sliding door in which a plate door body part slides in two opposite directions, the plate door body part being at least partially gravitationally assisted by the weight of the plate door body part while sliding in one of the two opposite directions,
   an angle of the first air mix door relative to a front-rear direction of the vehicle which is a direction perpendicular to an up-down direction of the vehicle is greater than an angle of the second air mix door relative to the direction perpendicular to the up-down direction,
   the second air passage is located at a lower side of the first air passage in the up-down direction, the air conditioner further comprising: a first bypass passage provided at an upper side of the heating heat exchanger in the up-down direction in the first air passage to let the outside air bypass the heating heat exchanger; and a second bypass passage provided at a lower side of the heating heat exchanger in the up-down direction in the second air passage to let the inside air bypass the heating heat exchanger,
   the heating heat exchanger is located on a downstream side of the first and second air mix doors in the air flow direction,
   a lowermost position of the second air mix door within a slide range of the second air mix door in the up-down direction is located on a downstream side in the air flow direction of an uppermost position of the second air mix door within the slide range of the second air mix door in the up-down direction,
   the lowermost position of the second air mix door is located on a downstream side in the air flow direction of a slide range of the first air mix door,
   the heating heat exchanger is inclined such that a lower end of the heating heat exchanger in the up-down direction is located on a downstream side in the air flow direction of an upper end of the heating heat exchanger in the up-down direction, and
   the heating heat exchanger has a part located directly above the slide range of the second air mix door in the up-down direction.

2. The air conditioner according to claim 1, further comprising an actuation mechanism configured to actuate and operatively link the first air mix door and the second air mix door, wherein the first air mix door slides downward in the up-down direction when the second air mix door slides upward in the up-down direction.

3. The air conditioner according to claim 1, wherein
   a lowermost position of the first air mix door within the slide range of the first air mix door in the up-down direction is located on a downstream side in the air flow direction of the uppermost position of the second air mix door in the up-down direction, and
   the lowermost position of the first air mix door is located at a lower side in the up-down direction of the uppermost position of the second air mix door in the up-down direction.

4. The air conditioner according to claim 1, wherein the heating heat exchanger includes a heat-exchange core part having a plurality of tubes through which a heat-exchange medium flows, and a pair of tanks which distribute the heat-exchange medium to the plurality of tubes of the heat-exchange core part and receive the heat-exchange medium from the plurality of tubes, and the pair of tanks are an upper tank arranged at an upper end of the heat-exchange core part, and a lower tank arranged at a lower end of the heat-exchange core part, the air conditioner further comprising: a first shaft configured to be rotatable and to transform a movement of the first shaft to a sliding movement of the first air mix door; and a second shaft configured to be rotatable and to transform a movement of the second shaft to a sliding movement of the second air mix door, wherein the first shaft is arranged adjacent to the upper tank, and the second shaft is arranged adjacent to the lower tank.

5. The air conditioner according to claim 1, further comprising: a first guide groove configured to guide the first air mix door in the sliding direction of the first air mix door; and a second guide groove configured to guide the second air mix door in the sliding direction of the second air mix door, wherein each of the first and second guide grooves is a pair of opposed walls extending linearly, the first guide groove has a cutout at a lower end part of the one of the pair of opposed walls, and the second guide groove has a cutout at a lower end part of the one of the pair of opposed walls.

6. The air conditioner according to any one of claim 1, wherein
the heating heat exchanger extends in the up-down direction or an upper part of the heating heat exchanger is inclined upstream in an air flow from the vertical direction,
the first and second air mix doors are located at an upstream side of the heating heat exchanger in the air flow,
the first air mix door extends in the up-down direction or an upper part of the first air mix door is inclined upstream in the air flow from the vertical direction,
the second air mix door is located at a lower side of the first air mix door in the up-down direction, and an upper part of the second air mix door is inclined upstream in the air flow from the up-down direction, and
a lower end position of the second air mix door within a slide range thereof is located directly below a lower end of the heating heat exchanger in the up-down direction.

7. An air conditioner for a vehicle comprising:
a casing having therein a first air passage through which outside air flows toward a vehicle compartment, and a second air passage through which inside air flows toward the vehicle compartment in an inside-outside air double-layer mode;
a heating heat exchanger arranged in the first air passage to heat the outside air flowing in the first air passage, and arranged in the second air passage to heat the inside air flowing in the second air passage;
a partition plate disposed upstream of the heating heat exchanger in an air flow direction and separating the first air passage and the second air passage;
a first air mix door arranged in the first air passage to adjust a ratio between a flow amount of the outside air passing through the heating heat exchanger and a flow amount of the outside air bypassing the heating heat exchanger; and
a second air mix door arranged in the second air passage to adjust a ratio between a flow amount of the inside air passing through the heating heat exchanger and a flow amount of the inside air bypassing the heating heat exchanger, wherein
the first air mix door includes a first sliding door which slides between a first position and a second position, the first sliding door being gravitationally assisted by the weight of the first sliding door when sliding from the first position to the second position of the first sliding door;
the second air mix door includes a second sliding door which slides between a first position and a second position, the second sliding door being gravitationally assisted by the weight of the second sliding door when sliding from the first position to the second position of the second sliding door;
an angle of the first sliding door relative to a front-rear direction of the vehicle which is a direction perpendicular to an up-down direction of the vehicle is greater than an angle of the second sliding door relative to the direction perpendicular to the UP-down direction,
the second air passage is located at a lower side of the first air passage in the up-down direction, the air conditioner further comprising: a first bypass passage provided at an upper side of the heating heat exchanger in the up-down direction in the first air passage to let the outside air bypass the heating heat exchanger; and a second bypass passage provided at a lower side of the heating heat exchanger in the up-down direction in the second air passage to let the inside air bypass the heating heat exchanger,
the heating heat exchanger is located on a downstream side of the first and second sliding doors in the air flow direction,
a lowermost position of the second sliding door within a slide range of the second sliding door in the up-down direction is located on a downstream side in the air flow direction of an uppermost position of the second sliding door within the slide range of the second sliding door in the up-down direction,
the lowermost position of the second sliding door is located on a downstream side in the air flow direction of a slide range of the first sliding door,
the heating heat exchanger is inclined such that a lower end of the heating heat exchanger in the up-down direction is located on a downstream side in the air flow direction of an upper end of the heating heat exchanger in the up-down direction, and
the heating heat exchanger has a part located directly above the slide range of the second sliding door in the up-down direction.

8. The air conditioner according to claim 7, further comprising an actuation mechanism configured to actuate and operatively link the first air mix door and the second air mix door, wherein the first air mix door slides downward when the second air mix door slides upward.

9. The air conditioner according to claim 7, wherein:
the heating heat exchanger is inclined at an angle relative to the direction perpendicular to the up-down direction such that a first end of the heating heat exchanger is lower than a second end of the heating heat exchanger in the up-down direction;
the second position of the second sliding door is lower in the up-down direction than the first position of the second sliding door;
the second position of the second sliding door is lower in the up-down direction than the second position of the first sliding door; and
the heating heat exchanger is located directly above the second sliding door in the up-down direction.

10. The air conditioner according to claim 7, wherein:
the heating heat exchanger has a first end immediately adjacent the first air mix door and a second end immediately adjacent the second air mix door, the second end being lower in the up-down direction than the first end;
the second position of the second sliding door is lower in the up-down direction than the first position of the second sliding door; and
the second position of the second sliding door is lower in the up-down direction than the second position of the first sliding door.

11. The air conditioner according to claim 7, wherein the heating heat exchanger includes a heat-exchange core part having a plurality of tubes through which a heat-exchange medium flows, and a pair of tanks which distribute the heat-exchange medium to the plurality of tubes of the heat-exchange core part and receive the heat-exchange medium from the plurality of tubes, and the pair of tanks are an upper tank arranged at an upper end of the heat-exchange core part, and a lower tank arranged at a lower end of the heat-exchange core part, the air conditioner further comprising: a first shaft configured to be rotatable and to transform a movement of the first shaft to a sliding movement of the first air mix door; and a second shaft configured to be rotatable and to transform a movement of the second shaft to a sliding movement of the second air mix door, wherein the first shaft is arranged adjacent to the upper tank, and the second shaft is arranged adjacent to the lower tank.

12. The air conditioner according to claim 7, further comprising: a first guide groove configured to guide the first air mix door in the sliding direction of the first air mix door; and a second guide groove configured to guide the second air mix door in the sliding direction of the second air mix door, wherein each of the first and second guide grooves is a pair of opposed walls extending linearly, the first guide groove has a cutout at a lower end part of the one of the pair of opposed walls, and the second guide groove has a cutout at a lower end part of the one of the pair of opposed walls.

13. The air conditioner according to any one of claim 7, wherein
the heating heat exchanger extends in up-down direction or an upper part of the heating heat exchanger is inclined upstream in an air flow from the up-down direction,
the first and second air mix doors are located at an upstream side of the heating heat exchanger in the air flow,
the first air mix door extends in the up-down direction or an upper part of the first air mix door is inclined upstream in the air flow from the up-down direction,
the second air mix door is located at a lower side of the first air mix door, and an upper part of the second air mix door is inclined upstream in the air flow from the up-down direction, and
a lower end position of the second air mix door within a slide range thereof is located directly below a lower end of the heating heat exchanger in the up-down direction.

14. The air conditioner according to claim 1, wherein
an angle of the heater core relative to the direction perpendicular to the up-down direction is greater than or equal to the angle of the first air mix door relative to the direction perpendicular to the up-down direction, and
an angle of the heater core relative to the direction perpendicular to the up-down direction is greater than the angle of the second air mix door relative to the direction perpendicular to the up-down direction.

15. The air conditioner according to claim 14, wherein the angle of the heater core relative to the direction perpendicular to the up-down direction is equal to the angle of the first air mix door relative to the direction perpendicular to the up-down direction.

16. The air conditioner according to claim 1, wherein
the first air mix door has a straight shape to be parallel to a sliding direction of the first air mix door, and
the second air mix door has a straight shape to be parallel to a sliding direction of the second air mix door.

17. The air conditioner according to claim 1, wherein an entire part of the heating heat exchanger is located directly above the slide range of the second air mix door in the up-down direction.

* * * * *